June 30, 1936.  D. D. HUBBELL  2,045,654

MULTIFOCAL OPHTHALMIC LENS BLANK AND LENS AND METHOD OF MAKING THE SAME

Filed Dec. 20, 1934  2 Sheets-Sheet 1.

INVENTOR.
Daniel D. Hubbell.
BY
ATTORNEYS.

June 30, 1936.  D. D. HUBBELL  2,045,654
MULTIFOCAL OPHTHALMIC LENS BLANK AND LENS AND METHOD OF MAKING THE SAME
Filed Dec. 20, 1934  2 Sheets-Sheet 2
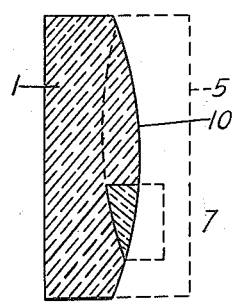
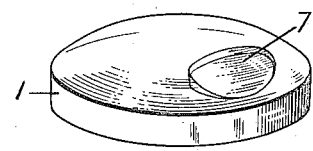
Fig. 10
Fig. 11
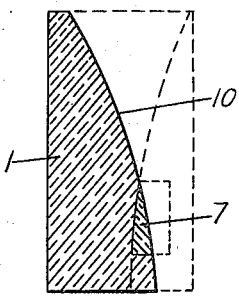
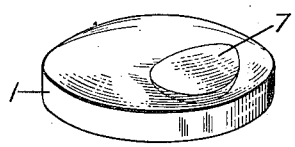
Fig. 12
Fig. 13
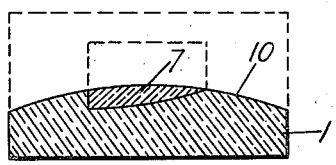
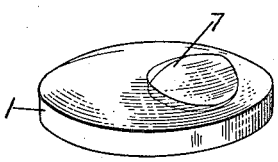
Fig. 14
Fig. 15
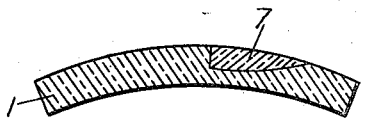
Fig. 16
INVENTOR.
Daniel D. Hubbell.
BY
ATTORNEYS.

UNITED STATES PATENT OFFICE 2,045,654

MULTIFOCAL OPHTHALMIC LENS BLANK AND LENS AND METHOD OF MAKING THE SAME

Daniel D. Hubbell, Columbus, Ohio, assignor to Bausch & Lomb Optical Company, Rochester, N. Y., a corporation of New York Application December 20, 1934, Serial No. 758,517

11 Claims. (Cl. 88—54)

This invention relates to multifocal ophthalmic lens blanks and lenses and methods of making the same. It has to do, more particularly, with fused multifocal lens blanks and lenses and the methods of making the same. It is especially applicable to fused bifocal lenses and lens blanks, although it is also applicable to lenses and lens blanks having more than two fields of vision.

In the prior art, comparatively recent developments have made possible the production of multifocal lenses wherein reading segments and the intermediate vision segments could be given the form of prisms with the optical centers thereof located in any desired relation to the geometrical center of such segments. For example in bifocal lenses, these developments have made possible the production of reading portions with prism base-in, base-out, base-up or base-down. One method of accomplishing this has consisted in the production of a major lens blank with a spherical countersink therein and the fusing in such countersink of a carrier button of the same index of refraction as the major lens blank, this carrier button completely surrounding a reading segment of a different index of refraction.

Several methods have been used for producing lens blanks and lenses of this type with the reading segments base-in, base-out, base-up or base-down. One method has involved the production of a major lens blank of concavo-convex form with a spherical countersink disposed in the convex surface thereof and in off-center relation to the geometrical center of the blank, followed by the location of the composite button in the countersink, with the reading segment button substantially centered in the countersink and the subsequent grinding of the bifocal surface of the lens with the axis of the grinding tool so disposed as to throw the base of the reading segment in any desired direction. Another method has involved the location of the composite button in a spherical countersink in the convex side of a concavo-convex lens in such a manner as to displace the reading segment button from substantially concentric relation with the countersink so that the grinding of the bifocal surface of the lens would locate the base of the reading segment as predetermined by the direction of displacement of this reading segment without reliance upon the positioning of the axis of the grinding tool to bring about the desired prismatic condition.

These methods have both been meritorious but they possess certain drawbacks and disadvantages. In none of these methods was there provided a positive means for determining accurately the axis of grinding that was to be used in the finishing of the front curve. It required skill and experience of a high order to properly grind these front surfaces, and even then there was considerable loss. For these reasons, these front surfaces were ground to order at the factory with attendant delay and disappointment in delivery.

Another drawback has arisen from the use of a molded concavo-convex lens blank of relatively slight thickness and the provision of the countersink in a convex surface, namely, the convex surface of this lens blank. This spherical countersink has ordinarily been of substantially less area than the blank itself and the reading segment button lying below the convex surface of the blank was of limited thickness. This resulted in a limited amount of glass subject to grinding for varying prismatic power and a consequent severe limitation of the amount of prism that could be introduced into the reading segment and, in turn, in a consequent severe limitation of the number of different prismatic values obtainable from any given blank. In other words, it both limited the degree of prism that could be readily obtained in a bifocal lens and increased the number of rough blanks necessary for the production of any given number of lenses with reading segments of different prismatic values.

One of the objects of this invention is to provide a fused multifocal lens blank having an embedded segment of different index from the main blank and so constructed that the amount of prism in the segment, the location of the base of the prism, the location of the optical center of the segment, and the amount of the add, will be predetermined, calculated, and produced to specifications desired.

Another object of this invention is to provide a series of multifocal lens blanks suitable for accomplishing the above results, whereby each of the blanks will be available for making numerous possible optical and prismatic values when finished, in accordance with the method and plans herewith disclosed.

Another object of this invention is to provide a series of fused multifocal lens blanks wherein the major part will be of one index of refraction and will have embedded therein a piece of glass of a different index of refraction of substantial thickness and of such construction that the average optical shop workman may, without difficulty, produce from said blanks finished lenses which will have the amount of add, the amount of prismatic value, the location of the base of the prism and the location of the optical center of the segment according to predetermined specifications.

Another object of this invention is to provide a method of making a fused multifocal lens blank wherein the grinding of the bifocal surface of the lens blank to a predetermined radius of curvature may be mathematically effected so that the segment may be reduced to the minimum thickness possible while still conforming to the specifications necessary to produce the lenticular values for the particular requirements of a given prescription.

Another object of this invention is to provide a series of fused multifocal lens blanks which will permit the optician to grind from a minimum number of blanks of maximum variety of multifocal lenses, with respect to dioptric powers, prismatic values and the optical center locations of the reading segments.

Another object of this invention is to provide a series of fused multifocal lens blanks which are of such construction that, with a minimum number of lens blanks, the optician can grind a maximum variety of multifocal lenses with a maximum number of dioptric powers, prismatic values and optical center locations of both the reading portions and the distance vision portion.

I have departed from the prior art practice of providing a countersink in a main blank at a haphazard inclination and, instead, have conceived the idea of providing a finished optical surface on the main blank, which finished optical surface is in a predetermined and known relation to the base of the blank so that, when the reading segment button is fused upon such finished optical surface in conjunction with the carrier button which surrounds it, the optician may then proceed to grind the bifocal surface of the lens blank into a predetermined and known relation to the base of the blank, with the result that the optical center of the reading portion will be mathematically and exactly located, the value of any prism will be mathematically and accurately determined and the dioptric value of this reading portion will also be mathematically and exactly provided.

Preferably, I use a main blank of cylindrical form with a top surface entirely finished to form an optical surface disposed a predetermined known distance from the base of the blank which is flat or curved and of sufficient smoothness to permit measurement of the thickness of the blank by means of calipers. Since the edges of this optical surface are coincident with the periphery of the blank, the distance of such surface from the base of the blank may be readily measured. I then provide a composite button, embodying a carrier button of the same index of refraction as the main blank and a reading segment button of a different index of refraction. The under side of this composite button is provided with an optical surface substantially conforming to the optical surface of the main blank and this composite button is then fused upon the optical surface of the main blank so that the carrier button becomes an integral part thereof while the base of the reading segment button rests upon and is fused to such optical surface.

One embodiment of my invention is shown in the accompanying drawings wherein similar characters of reference designate corresponding parts and wherein:

Figure 10 is a diagrammatic view illustrating a method of grinding the rough blank to form the bifocal surface thereof with the base of the reading segment towards the center of the blank.

Figure 11 is a perspective view of the semifinished blank produced by the method illustrated in Figure 10.

Figure 12 is a diagrammatic view illustrating a method of grinding the bifocal surface of the blank to produce a reading segment of prismatic form with the base thereof directed away from the center of the blank so that a prism base-down is formed.

Figure 13 is a perspective view of the semifinished blank produced by the method of Figure 12.

Figure 14 is a diagrammatic view illustrating the method of grinding the bifocal surface of the blank to produce a reading segment either base-in or base-out therein.

Figure 15 is a perspective view of the semifinished blank produced by the method of Figure 14.

Figure 16 is a transverse sectional view of a finished lens produced from the blank shown in Figure 10.

Figure 1:
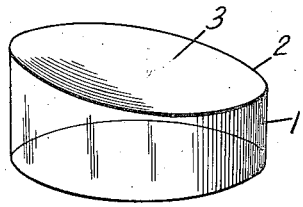
Figure 1 is a perspective view of a major blank before grinding of the upper surface thereof.
Figure 2:
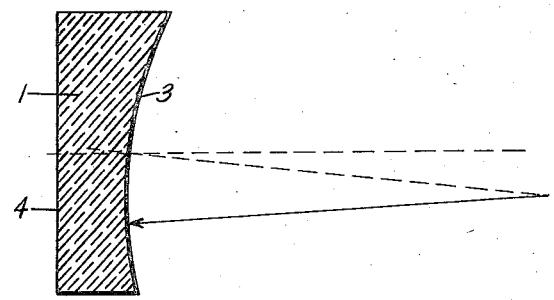
Figure 2 is a vertical section of the blank of Figure 1, after the upper surface thereof has been ground to produce an inclined spherical optical surface.

In the drawings, the main blank is shown at 1, in Figures 1 and 2. It comprises a block of glass which is preferably cylindrical, except that in the condition shown in Figure 1 it has been molded to provide an upper surface 2 of spherical form and of a contour approximating the contour of a spherical optical surface to be ground thereon. In the form shown in Figure 2, the upper surface 2 has been ground away to form the spherical optical surface 3. This spherical optical surface 3 is disposed at an angle with reference to the base of the main blank, which base is sufficiently flat and smooth to permit of measurement of the thickness of the blank by means of calipers. This spherical optical surface 3 is shown as covering the entire upper surface of the cylindrical blank 1.

When finished to form the optical surface 3, the outer edges of this surface bear a predetermined and readily measurable relation to the flat base 4 of this main blank. This is another way of saying that the axis of the grinding tool which produced this spherical optical surface was maintained at a selected and predetermined angle with relation to the axis of the cylindrical blank, so that the angle of inclination of this curved optical surface 3 was definitely known and predetermined and at all times capable of ready determination by measuring the thickness of the blank at different points on its periphery. Thus, by measuring the distance of the edges of this optical spherical surface from the base of the blank along a plurality of lines on the periphery of the blank, the angle of inclination of this spherical optical surface can be determined with certainty.

Figure 3:
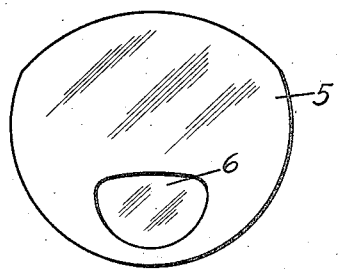
Figure 3 is a bottom plan view of a carrier blank or button.
Figure 4:
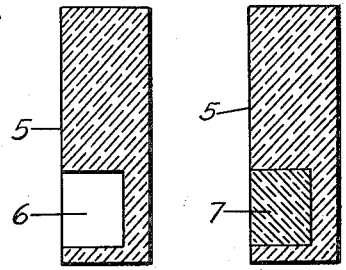
Figure 4 is a vertical section of the carrier button shown in Figure 3.
Figure 5:
Figure 5 is a vertical section of this carrier button with a reading segment embedded therein.
Figure 6:
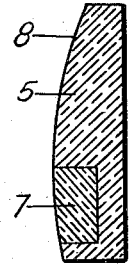
Figure 6 is a vertical section, similar to that shown in Figure 5, except that the segment bearing side of the carrier button has been ground to a curvature approximating the curvature of the spherical optical surface already provided upon the main blank as shown in Figure 2.

With the main blank thus formed, it is ready for the reception of the composite carrier button, which is formed of the parts shown in Figures 3, 4 and 5 and which is illustrated in its final form in Figure 6. As illustrated in Figures 3 and 4, the carrier button 5 is initially formed with a socket 6 extending through its bottom surface for a substantial distance. Though this socket 6 is provided with a closed base, it may take the form of a perforation extending through the carrier blank or button 5, if desired.

This carrier button 5 is of the same index of refraction as the main blank. The socket 6 thereof is designed for the reception of a reading segment button 7 of a different index of refraction from the carrier button which is thereupon fused in the socket, as indicated in Figure 5. Upon the completion of this fusing operation, an optical surface 8 of a contour approximating the contour of the optical surface 3 of the main blank is ground upon the composite button thus formed. This optical surface 8 is disposed at an angle approximately the same as that of surface 3 of the main blank and is of a curvature which approximates the curvature of the optical surface 3 of the main blank.

Figure 7:
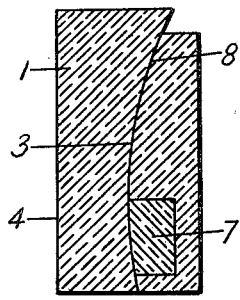
Figure 7 shows a sectional view of the main blank of Figure 2 with the composite button or blank of Figure 6 superimposed thereon before fusing.
Figure 8:
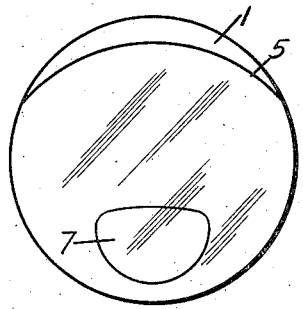
Figure 8 is a plan view of the blank shown in Figure 7.
Figure 9:
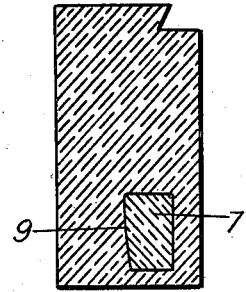
Figure 9 is a side view of the blank shown in Figure 8, after fusing.

As shown in Figure 7, the composite button thus formed is superimposed upon or laid in contact with the optical surface 3 on the main blank 1. It is preferably so disposed that the thinner portion of the composite button is opposite the thicker portion of the main blank while the thicker portion of the composite button is opposite the thinner portion of the main blank. Preferably, the edges of this composite button are coincident with the edges of the main blank throughout the greater portion of the peripheries thereof. With this relative position of the main blank and composite button attained, a fusing heat is applied, so that there results the rough blank shown in Figures 8 and 9. By reference to Figure 9, it will be seen that this fusing heat has caused the carrier button to become integral with the major blank, while the reading segment has become completely enclosed within this blank with its base curved in conformity to the curvature and angle of inclination of the surface 3 of the main blank.

Thus, it will be apparent that the blank which has been produced is of substantially cylindrical form and has a flat relatively smooth base 4 and a reading segment button 7 embedded within the blank and having a lower curved surface 9 of curvature and angle of inclination which has been predetermined by contact with and fusion to the optical surface of the main blank.

In practice, an identifying mark is placed on the main blank, to indicate the index of refraction of the glass of the main blank, the index of refraction of the glass of the reading segment, and the radius of the optical surface 3 or base 9 of the reading segment, as well as the angular relation of this optical surface 3 or base of the reading segment to the base 4 of the main blank 1. With this knowledge at hand, the operator who is to compute the curve 10 (see Figures 10, 12 and 14) determines the amount of the add. Likewise, as indicated in these figures, he makes his measurements in computing the surface 10 which is to be ground on the bifocal side of the blank to obtain the prismatic value desired in the reading segment. When this grinding is done by hand, the amount of prismatic value imparted to the segment may be produced by grinding the bifocal surface of the blank so that its edge will be closer to the base 4 of the blank at one side than at the other, with these distances from the base of the blank being measured to produce the exact prismatic value desired. This may be done readily, since the curvature and angle of inclination of the base of the segment with relation to the base of the blank has been definitely and accurately predetermined and since the distance between the bifocal surface edges and the base of the blank may be determined readily.

If the curve on the bifocal surface of the blank is to be generated on a grinding machine, instead of being ground by hand, then the main blank may be blocked in proper angular relation with respect to the base 4 of the blank, so as to cause the curve on the bifocal side to be generated so as to produce the proper amount of prismatic value in the segment.

Since the measurements are accurately related to the smooth base, the bifocal surface may be so generated as to reduce the segment thickness to the greatest possible amount commensurate with the attainment of proper prismatic values. In other words, with the optical surface 3 and the base 9 of the segment having a known angular relation to the base of the blank, it is merely necessary to generate the bifocal surface of the blank in just the proper amount to produce a segment which will have proper prismatic value and, at the same time, no greater thickness than absolutely necessary.

It will also be apparent, particularly by inspection of Figures 10 to 15, inclusive, that the generation of the bifocal surface indicated by the curve 10 can be readily effected at such an angle with relation to the base of the blank or with relation to the axis of the blank as to produce a reading segment with its base up, a reading segment with its base down or a reading segment with its base in or out. Thus, Figure 10 illustrates diagrammatically the curve 10 which, in the blank shown, is ground at such an angle as to produce a reading segment base-up, while Figure 11 illustrates the semifinished blank wherein the reading segment is base-up. In Figure 12, the curve 10 is shown ground at such an angle as to form the reading segment base-down, while Figure 13 shows the semifinished blank resulting therefrom. Figure 14 shows a blank wherein the curve 10 is generated at such an angle as to produce a reading segment which is base-in or base-out, while the semifinished blank shown in Figure 15 shows the result of the grinding operation indicated diagrammatically in Figure 14.

It should be understood that, though the main blank and the composite button are both of a form which may be termed prismatic, this is not necessarily so, since neither need be prismatic in the adaptation of my invention to certain conditions. Likewise, it is not necessary that the optical surface 3 be either concave or spherical. It may be convex and may, in some cases, be toric or cylindrical. Likewise, it is not necessary that the blank be made up of a main blank which is thicker on one side and which has superimposed thereon a composite button which is thicker on one side but which has its thin side opposing the thicker side of the main blank.

In finishing the lens, it is merely necessary to grind the prescription curve on the base 1 of the blank. This may be so ground as to introduce prism in the distance portion or not, as desired. It will also be understood that the prismatic values of both the reading portion and the distance portion, if the latter is prismatic, may be predetermined exactly, while the optical centers of these portions may also be predetermined.

It will be seen that my invention possesses numerous important advantages and novel features. In the first place, it makes possible the production of a bifocal lens wherein the add of the reading segment, the prismatic value of this segment and the optical center of the segment and, consequently, of the reading portion of the lens, may be predetermined and fixed with mathematical certainty. Moreover, the manner in which this is accomplished is such that the ordinary skilled worker in an optical shop can accomplish this from the rough blank, so that it will no longer be necessary to have this work done at the factory with resultant delay and inconvenience.

By providing a blank of considerably greater depth than customary in the prior art, and having the reading segment button of substantial thickness and disposed a substantial distance from the base of the blank and also from the top of the blank, with the lower surface of the reading segment button disposed at a definite and known inclination and curvature, it is possible to produce bifocal lenses wherein the reading segments have greater range of adds, greater range of prismatic values and variable optical centers of more accurately predetermined location than hitherto possible.

Another feature of advantage arises from the use of a main blank with an optical surface formed on its upper surface and with its deepest point of depression disposed at or adjacent one edge of the blank, instead of at the center of the depression as is customary in the countersinks previously used in the prior art. This novel feature makes possible the use of a blank of lesser diameter while, at the same time, permitting an angle of inclination on the base of the reading segment which is markedly greater. This permits the formation of a reading segment having a greater range of adds by the use of a blank of a lesser diameter. It also permits of the formation of a prism segment of higher prismatic value. It also gives a greater range of location of the optical center of the reading segment.

The particular form of the composite button, namely, wedge-shaped formation thereof, further increases the possible adds, the possible prismatic value and the possible range of location of the optical centers of the reading segments. In other words, with this wedge-shaped composite button, the composite button may contain a reading segment of greater thickness than the old circular button while the composite button itself is of lesser diameter.

In other words, though the use of angularly disposed abutting surfaces on the main blank and composite button are not necessary to all forms of my invention, they have certain advantages over the prior art main blanks with the composite button disposed in a circular countersink, particularly where it is desired to impart to the reading segment relatively high dioptric values and relatively high prismatic values which are obtainable with greater certainty than with blanks of smaller diameter.

It should be understood that this invention is not limited to the formation of bifocal lenses or lens blanks but is capable of application to the making of lenses or lens blanks having more than two fields of vision.

Having thus described my invention, what I claim is:

1. A fused lens blank for making a multifocal ophthalmic lens comprising a body portion of glass of a suitable index of refraction and a segment of glass of a different index of refraction and of substantial thickness throughout its entire area embedded to a substantial extent throughout its entire area in said body portion so as to produce an embedded shoulder extending substantially therearound, said body portion having a base and said embedded segment having a base which is optically surfaced in a known and predetermined manner, said segment being located at a predetermined position within the area of said body portion, said optically surfaced base of said segment being disposed at such a known and predetermined distance from the base of said body portion and in such a known and predetermined relation to said base of said body portion that the finishing of the top of said segment and the surrounding glass of the body portion to a known and predetermined distance from the base of said body portion and in a known and predetermined relation to the base of said body portion and said optically surfaced base of said segment will simultaneously determine the amount of the add of the segment, the prismatic power of the segment, if any, and the location of the prism base, and the thickness of such segment.

2. A fused lens blank for making a multifocal ophthalmic lens comprising a body portion of glass of a suitable index of refraction and a segment of glass of a different index of refraction and of substantial thickness throughout its entire area embedded to a substantial extent throughout its entire area in said body portion so as to produce an embedded shoulder extending substantially therearound, said body portion having a substantially flat base and said embedded segment having a base which is optically surfaced to a known and predetermined curvature, said segment being located at a predetermined position within the area of the blank, said optically surfaced base of said segment being disposed at such a known and predetermined distance from the flat base of said main body portion and at such a known and predetermined angle with relation to said flat base of said body portion that the finishing of the top of said segment and the surrounding glass to known and predetermined distances from the base of the body portion calculated at different points around the periphery of the blank so that the finished surface will be in a known and predetermined relation to the flat base of said body portion and to the optically surfaced base of said segment will simultaneously determine the prismatic power of the segment and the location of the prism base.

3. A fused lens blank for making a multifocal ophthalmic lens comprising a body portion of glass of a suitable index of refraction and a segment of glass of a different index of refraction and of substantial thickness throughout its entire area embedded to a substantial extent throughout its entire area in said body portion so as to produce an embedded shoulder extending substantially therearound, said body portion having a substantially flat base and said embedded segment having a base which is optically surfaced to a known and predetermined curvature, said segment being located at a predetermined position within the area of the body portion so that the vertical meridian thereof and that of the blank substantially coincide, said optically surfaced base of said segment being disposed at such a known and predetermined distance from the flat base of said body portion and at such a known and predetermined angle with relation to said flat base of said body portion that the finishing of the top of said segment and the surrounding glass in angular relation to the flat base of said body portion such that various points along the peripheral edge of the top surface of said body portion will be at various distances from the flat base thereof and such that the finished surface will be in a known and predetermined angular relation to said flat base of the body portion and to the optically surfaced base of said segment will simultaneously determine the prismatic power of the segment and the location of the prism base.

4. A fused lens blank for making a multifocal ophthalmic lens comprising a body portion of glass of a suitable index of refraction and a segment of glass of a different index of refraction and of substantial thickness throughout its entire area embedded to a substantial extent throughout its entire area in said body portion so as to produce an embedded shoulder extending substantially therearound, said body portion having a base, said segment being located at a predetermined position within the area of said body portion, said embedded segment having a base which is optically surfaced in a known and predetermined manner, said optically surfaced base of said segment being disposed at such a known and predetermined position with relation to said base of said body portion that the finishing of the top of said segment and the surrounding glass of the body portion to a known and predetermined relation to the base of said body portion and to the optically surfaced base of said segment will simultaneously determine the amount of the add of the segment, the prismatic power of the segment, if any, and the location of the prism base, and the thickness of such segment.

5. An unfinished lens blank adapted to be used in making a fused multifocal ophthalmic lens comprising a main blank of glass of a suitable index of refraction having a base and an optically prepared top surface disposed at a known and predetermined distance from said base and being in a known and predetermined relation to said base, and a composite button adapted to be fused onto said optically prepared surface of said main blank, said composite button comprising a carrier portion formed of glass of the same index of refraction as the main blank and a segment of different index of refraction which is of substantial thickness throughout its entire area and which is embedded in the carrier portion to a substantial extent throughout its entire area so that it is substantially laterally surrounded by the glass of the carrier portion but has one face exposed and so that the segment will have an embedded shoulder extending substantially therearound, the surface of the composite button having the exposed face of the segment being finished substantially complemental to said optically prepared top surface of said main blank, said composite button being adapted to be fused onto the optical surface of the main blank at a known and predetermined position thereon.

6. An unfinished lens blank adapted to be used in making a fused multifocal ophthalmic lens comprising a main blank of glass of a suitable index of refraction having a substantially flat base and an optically prepared upper surface of predetermined curvature formed across the entire upper surface of the main blank and disposed at known and predetermined distances from said flat base of the main blank which vary at different points around the periphery of the blank so that said surface is in a known and predetermined angular relation to said base and so that the main blank is substantially wedge-shaped in vertical cross-section, and a composite button adapted to be fused onto said optically prepared surface of said main blank, said composite button comprising a carrier portion formed of glass of the same index of refraction as the main blank and a segment of different index of refraction which is of substantial thickness throughout its entire area and which is embedded in the carrier portion at a known and predetermined location to a substantial extent throughout its entire area so that it is substantially laterally surrounded by the glass of the carrier portion but has one face exposed and so that an embedded shoulder is produced extending substantially around the segment, the surface of the composite button having the exposed face of the segment finished substantially complemental to the optically prepared surface of the main blank and in angular relation to the opposite surface of the composite button which is substantially flat so that the composite button is wedge-shaped in vertical cross-section, the composite button being of such an area and being adapted to be positioned on the main blank in such a manner that the vertical meridian of the segment thereof will substantially coincide with the vertical meridian of said main blank and so that the composite button will substantially cover the optical surface of the main body portion and the edges of the composite button will be substantially coincident with the edges of the main blank throughout the greater portion of the periphery thereof, the thicker portion of the composite button being adapted to be disposed above the thinner portion of the main blank.

7. The method of making a fused multifocal ophthalmic lens blank which comprises forming on one side of a main body portion of glass of a suitable index of refraction an optical surface which is located at a known and predetermined distance from the base of said main body portion and in a known and predetermined relation to the base of said main body portion, forming a composite button adapted to be fused onto said optical surface by forming a socket in a predetermined position in a carrier portion of glass of the same index of refraction as the main body portion and placing a segment of a different index of refraction and of substantial thickness throughout its entire area therein in such a manner that the segment will be substantially laterally surrounded by the glass of the carrier portion but will have one face exposed, finishing the surface of the composite button having the exposed face of the segment substantially complemental to said optical surface formed on the main body portion, placing the composite button on the optical surface of the main body portion in such a manner that the exposed face of the segment is in contact therewith and so that the segment will be located at a predetermined position thereon, fusing the composite button to said surface so that the segment will be embedded in the blank to a substantial extent throughout its entire area, and then finishing the multifocal surface of said blank so that the finished surface will be located at a known and predetermined distance from the base of the main body portion of the blank and in a known and predetermined relation to the base of the main body portion of the blank and to said optical surface of the main body portion so as to simultaneously determine the amount of the add of the segment, the prismatic power, if any, of the segment and the location of the prism base, and the thickness of the segment.

8. The method of making a fused multifocal ophthalmic lens blank which comprises forming on one side of a main body portion of glass of a suitable index of refraction a substantially flat base and forming on the other side an optically prepared top surface over substantially its entire area which is located at known and predetermined distances from the base of said main body portion which vary at different points around the periphery of said body portion so that it is disposed in a known and predetermined angular relation to the flat base, forming a composite button adapted to be fused onto said optical surface by forming a socket in a predetermined position in a carrier portion of glass of the same index of refraction as the main body portion and placing a segment of glass of a different index of refraction and of substantial thickness throughout its entire area therein in such a manner that the segment will be substantially laterally surrounded by the glass of the carrier portion but will have one face exposed, finishing the surface of the composite button having the exposed face of the segment substantially complemental to said optical surface formed on the main body portion, placing the composite button on the optical surface of the main body portion in such a manner that the exposed face of the segment is in contact therewith, and so that the segment will be located at a predetermined position thereon, fusing the composite button to said surface so that the segment will be embedded in the blank to a substantial extent throughout its entire area, and then finishing the multifocal surface of said blank so that the finished surface will be located at known and predetermined distances from the base of said main body portion which vary at different points around the periphery of said body portion so that it is in a known and predetermined angular relation to the flat base of said body portion of the blank and to said optical surface of the main body portion so as to simultaneously determine the prismatic power of the segment and the location of the prism base.

9. The method of making a fused multifocal ophthalmic lens blank which comprises forming on one side of a main body portion of glass of a suitable index of refraction an optical surface which bears a known and predetermined relation to the base of said main body portion, forming a composite button adapted to be fused onto said optical surface by forming a socket in a predetermined position in a carrier portion of glass of a suitable index of refraction and placing a segment of a different index of refraction and of substantial thickness throughout its entire area therein in such a manner that the segment will be substantially laterally surrounded by the glass of the carrier portion but will have one face exposed, finishing the surface of the composite button having the exposed face of the segment to form an optical surface thereon, placing the composite button on the optical surface of the main body portion in such a manner that the exposed face of the segment is in contact therewith and so that the segment will be located at a predetermined position thereon, fusing the composite button to said surface so that the segment will be embedded in the blank to a substantial extent throughout its entire area, and then finishing the multifocal surface of said blank in a known and predetermined relation to the base of the main body portion of the blank and to the optical surface of the main body portion so as to simultaneously determine the amount of the add of the segment, the prismatic power, if any, and the location of the prism base, and the thickness of said segment.

10. The method of making a fused multifocal ophthalmic lens blank which comprises forming on one side of a main body portion of glass of a suitable index of refraction an optical surface which is located at a known and predetermined distance from the base of said main body portion and is in a known and predetermined relation to the base of said main body portion, forming a composite button adapted to be fused onto said optical surface by forming a socket in a predetermined position in a carrier portion of glass of the same index of refraction as the main blank and placing a segment of a different index of refraction and of substantial thickness throughout its entire area therein in such a manner that the segment will be substantially laterally surrounded by the glass of the carrier portion but will have one face exposed, finishing the surface of the composite button having the exposed face of the segment substantially complemental to said optical surface formed on the main body portion, placing the composite button on the optical surface of the main body portion in such a manner that the exposed face of the segment is in contact therewith and so that the segment will be located at a predetermined position thereon, and fusing the composite button to said surface so that the segment will be embedded in the blank to a substantial extent throughout its entire area.

11. The method of making a fused multifocal ophthalmic lens blank which comprises forming on the lower side of a main blank of glass of a suitable index of refraction a substantially flat base and an optically prepared surface of predetermined curvature across the entire upper surface of the main blank which is located at known and predetermined distances from said base which vary at different points around the periphery of said body portion so that it is in a known and predetermined angular relation thereto so that the main blank will be substantially wedge-shaped in vertical cross-section, forming a composite button of substantially the same area as said main blank adapted to be fused onto said optically prepared surface of said main blank by forming a socket at a known and predetermined location in a carrier portion of glass of the same index of refraction as the main blank and placing a segment of glass of a different index of refraction and of substantial thickness throughout its entire area therein in such a manner that the segment will be laterally surrounded by the glass of the carrier portion but will have one face exposed, finishing the surface of the composite button having the exposed face of the segment substantially complemental to said optically prepared surface of the main blank and in angular relation to the opposite surface of the composite button which is substantially flat so that the composite button is wedge-shaped in vertical cross-section, placing the composite button on the optical surface of the main body portion in such a manner that the exposed face of the segment is in contact therewith and so that the segment is so located that its vertical meridan substantially coincides with the vertical meridan of the main blank and so that the composite button substantially covers the optical surface of the main blank and the edges of the composite button will be coincident with the edges of the main blank throughout the greater portion of the periphery thereof and in such a manner that the thicker portion of the composite button is disposed above the thinner portion of the main blank, and then fusing the composite button on the main blank portion.

DANIEL D. HUBBELL.